United States Patent
Cikanek et al.

(10) Patent No.: US 8,015,833 B2
(45) Date of Patent: Sep. 13, 2011

(54) AUTOMOTIVE CLIMATE SYSTEM AND METHOD OF CONTROLLING SAME

(75) Inventors: Susan Rebecca Cikanek, Northville, MI (US); William David Treharne, Ypsilanti Township, MI (US); Paul Stephen Bryan, Belleville, MI (US); David Jason Mack, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 12/473,389

(22) Filed: May 28, 2009

(65) Prior Publication Data

US 2010/0300125 A1   Dec. 2, 2010

(51) Int. Cl.
*F25B 1/00* (2006.01)

(52) U.S. Cl. .......................... 62/115; 62/228.4

(58) Field of Classification Search .............. 62/115, 62/228.3, 228.4, 241, 244, 133, 208; 165/42, 165/43
See application file for complete search history.

(56) References Cited

U.S. PATENT DOCUMENTS

| | | | | |
|---|---|---|---|---|
| 5,077,983 A * | 1/1992 | Dudley | ................ | 62/228.1 |
| 5,117,643 A * | 6/1992 | Sakurai et al. | ................ | 62/133 |
| 5,117,646 A * | 6/1992 | Nose et al. | ................ | 62/181 |
| 5,167,127 A * | 12/1992 | Ohtsu | ................ | 62/133 |
| 6,035,653 A * | 3/2000 | Itoh et al. | ................ | 62/228.4 |
| 6,209,331 B1 * | 4/2001 | Lake et al. | ................ | 62/180 |
| 6,523,361 B2 * | 2/2003 | Higashiyama | ................ | 62/228.4 |
| 6,622,500 B1 * | 9/2003 | Archibald et al. | ................ | 62/173 |
| 6,691,524 B2 * | 2/2004 | Brooke | ................ | 62/180 |
| 6,823,681 B2 | 11/2004 | Hirose et al. | | |
| 6,883,340 B2 | 4/2005 | Hirose et al. | | |
| 7,100,387 B2 * | 9/2006 | Boer et al. | ................ | 62/228.5 |
| 7,121,103 B2 * | 10/2006 | Itoh et al. | ................ | 62/173 |
| 7,174,733 B2 * | 2/2007 | Oomura et al. | ................ | 62/186 |
| 7,177,742 B2 * | 2/2007 | Makishima et al. | ................ | 701/36 |
| 7,337,622 B2 * | 3/2008 | Wang et al. | ................ | 62/150 |
| 7,347,056 B2 * | 3/2008 | Anyoji et al. | ................ | 62/133 |
| 7,562,698 B2 * | 7/2009 | Fujiki et al. | ................ | 165/202 |
| 7,677,050 B2 * | 3/2010 | Sakaguchi et al. | ................ | 62/183 |
| 7,765,822 B2 * | 8/2010 | Lee | ................ | 62/236 |
| 7,823,399 B2 * | 11/2010 | Egawa | ................ | 62/178 |
| 7,845,187 B2 * | 12/2010 | Patel et al. | ................ | 62/259.2 |
| 7,854,140 B2 * | 12/2010 | Lifson et al. | ................ | 62/259.2 |
| 2003/0136138 A1 * | 7/2003 | Tsuboi et al. | ................ | 62/228.1 |
| 2004/0079096 A1 * | 4/2004 | Itoh et al. | ................ | 62/223 |
| 2006/0130499 A1 * | 6/2006 | Hong et al. | ................ | 62/176.6 |
| 2006/0185375 A1 * | 8/2006 | Nadamoto et al. | ................ | 62/228.1 |
| 2007/0131408 A1 | 6/2007 | Zeigler et al. | | |
| 2007/0144194 A1 | 6/2007 | Lee | | |
| 2007/0186573 A1 | 8/2007 | Ziehr et al. | | |
| 2007/0193291 A1 | 8/2007 | Reddin et al. | | |
| 2007/0204639 A1 | 9/2007 | Harrison | | |

FOREIGN PATENT DOCUMENTS

WO    0029231 A1    5/2000

* cited by examiner

*Primary Examiner* — Mohammad Ali

(74) *Attorney, Agent, or Firm* — David B. Kelley; Brooks Kushman P.C.

(57) ABSTRACT

An automotive climate control system includes an evaporator, a variable speed compressor and a controller. The controller is configured to periodically alter a previous target evaporator temperature at a selected rate to generate a current target evaporator temperature, select a target compressor speed based on a difference between an actual evaporator temperature and the current target evaporator temperature, and command the compressor to operate at the target compressor speed.

13 Claims, 4 Drawing Sheets

AUTOMOTIVE CLIMATE SYSTEM AND METHOD OF CONTROLLING SAME

BACKGROUND

An automotive climate system may include a compressor that pressurizes and moves refrigerant through an evaporator. Such compressors operate to accommodate vehicle cabin cooling demands. Some compressors operate either at a full-on or full-off mode. That is, the speed of the compressor cannot be varied. Other compressors, such as electric air conditioning compressors, may operate at varied speeds.

SUMMARY

In certain embodiments, an automotive climate control system includes an evaporator, a variable speed compressor and a controller. The controller is configured to periodically alter a previous target evaporator temperature at a selected rate to generate a current target evaporator temperature, select a target compressor speed based on a difference between an actual evaporator temperature and the current target evaporator temperature, and command the compressor to operate at the target compressor speed.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
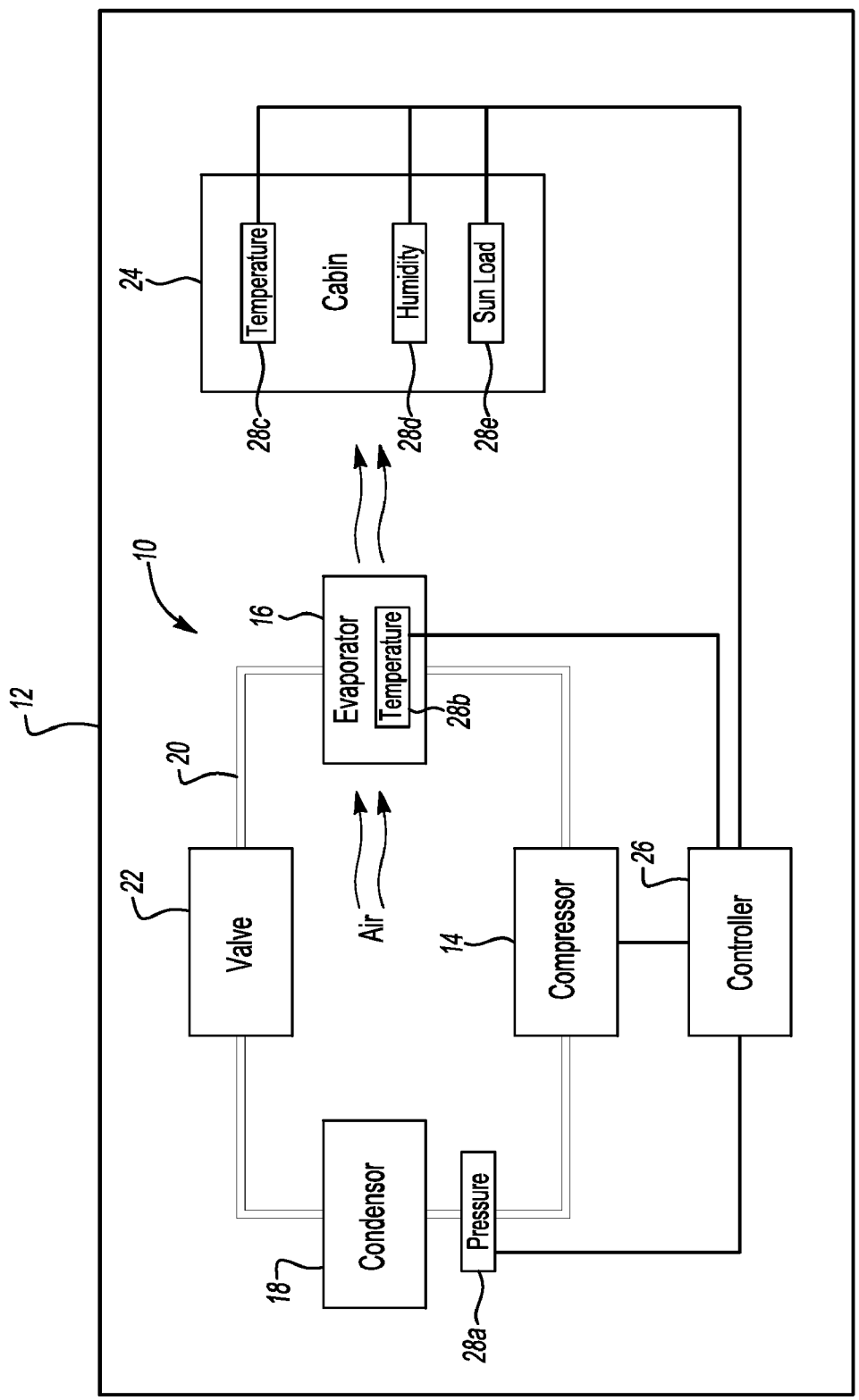
FIG. 1 is a block diagram of an embodiment of an automotive climate system.

Referring now to FIG. 1, an embodiment of a climate system 10 for an automotive vehicle 12 includes a variable speed compressor 14 (e.g., electric compressor), evaporator 16, condenser 18, fluid loop 20 and valve 22. As known to those of ordinary skill, coolant is circulated through the loop 20 which fluidly connects the compressor 14, evaporator 16 and condenser 18. The valve 22 may be actuated to control the flow of the coolant through the loop 20. The coolant cools air passing through the evaporator 16. This air may be used to cool a cabin 24 of the vehicle 12.

The system 10 further includes a controller(s) 26 and one or more sensors 28n (28a-28e). In the embodiment of FIG. 1, the sensor 28a senses the pressure in the loop 20 between the compressor 14 and condenser 18. The sensor 28b senses the temperature of the evaporator 16. The sensors 28c-28e sense the temperature, humidity and sun load respectively in the cabin 24. Other and or different sensors may also be used. Information sensed by the sensors 28n is communicated to the controller 26.

As known in the art, cabin temperature is related to evaporator temperature:

$$\text{cabin temp.} = f(\text{evaporator temp.}). \quad (1)$$

Additionally, evaporator temperature is related to compressor speed:

$$\text{evaporator temp.} = f(\text{compressor speed}). \quad (2)$$

Thus, cabin temperature is related to compressor speed:

$$\text{cabin temp.} = f(\text{compressor speed}). \quad (3)$$

To achieve a desired cabin temperature, a target evaporator temperature (and thus a corresponding compressor speed) may be selected by the controller 26.

Figure 2:
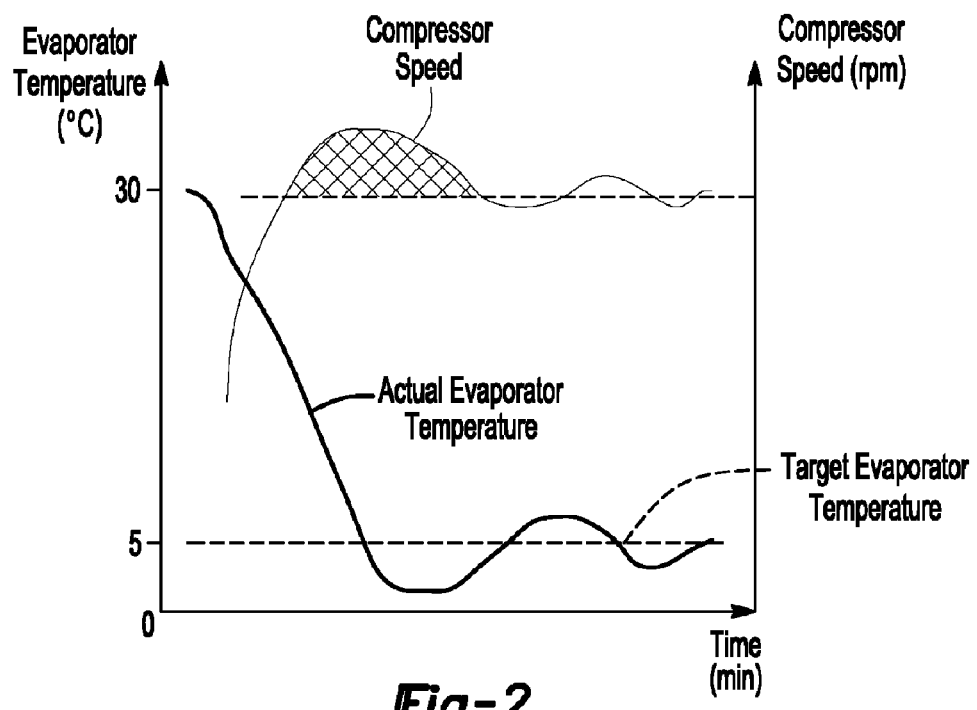
FIG. 2 is an example plot of actual evaporator temperature, target evaporator temperature and compressor speed versus time.

Referring now to FIG. 2, it is assumed that to achieve a desired cabin temperature of 7° C., the controller 26 selects a target evaporator temperature of 5° C. As known in the art, such targets may be established through testing, simulation, etc. The controller 26 may use a proportional-integral (PI) control scheme (or any other suitable control scheme) that determines the compressor speed based on a difference between the actual and target evaporator temperatures.

As apparent to those of ordinary skill, the actual temperature of the evaporator 16 exhibits a steep decline and overshoots (dips below) the target temperature of 5° C. before eventually settling about the target. This steep decline and overshoot results from the compressor speed continuing to increase until the sign of the difference between the actual and target evaporator temperatures turns from positive to negative. After this change in sign, the compressor speed begins to drop (until again the sign changes from negative to positive, etc.) and eventually settles at a speed capable of maintaining an evaporator temperature of 5° C. The cross-hatching under the compressor speed curve indicates that energy to operate the compressor 14 at speeds above that necessary to maintain an evaporator temperature of 5° C. may have been wasted.

Figure 3:
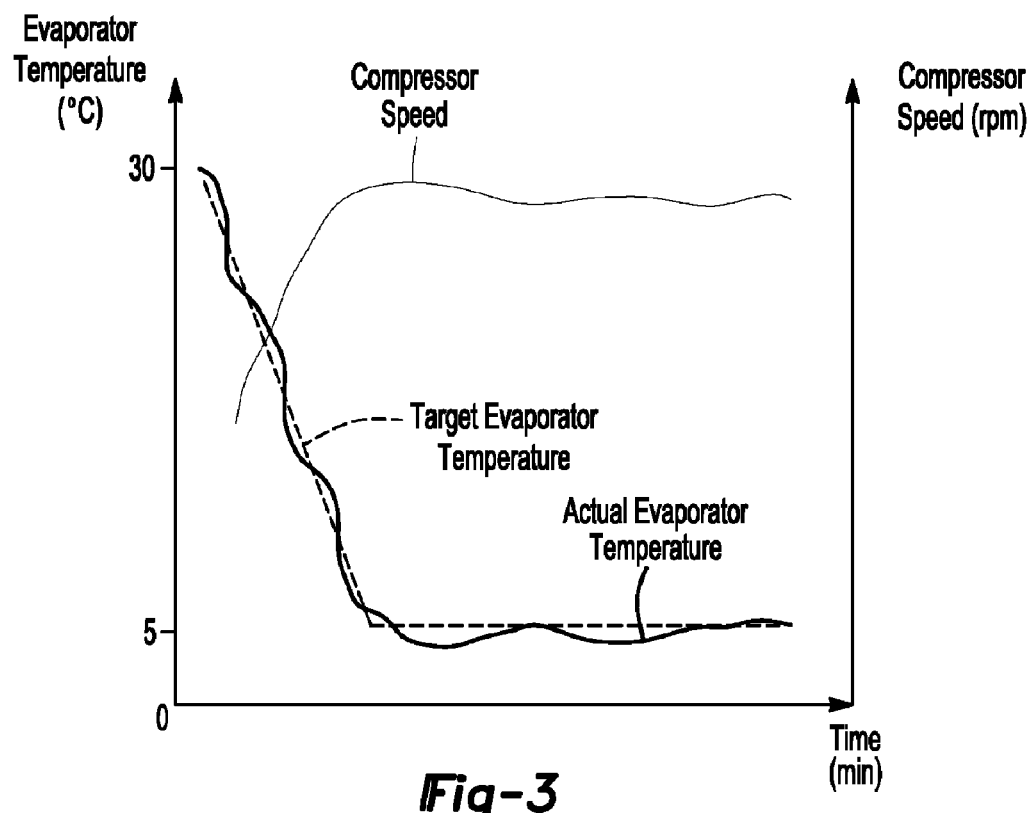
FIG. 3 is another example plot of actual evaporator temperature, target evaporator temperature and compressor speed versus time.

Alternatively, the controller 26 may step-wise reduce the target evaporator temperature to a final value to avoid operating the compressor 14 at speeds significantly above that necessary to maintain the final target evaporator temperature. Referring now to FIGS. 1 and 3, it is assumed that to achieve a desired cabin temperature of 7° C., the controller 26 selects a final target evaporator temperature of 5° C. The controller 26 may again use a proportional-integral (PI) control scheme (or any other suitable control scheme) that selects the compressor speed based on a difference between the actual and target evaporator temperatures. The controller 26, however, may select an initial target evaporator temperature that is relatively close to the actual evaporator temperature (e.g., 1° C. less than), and then periodically reduce it at a given rate until the final target (which in this example is 5° C.) is achieved.

As apparent to those of ordinary skill, the difference between the actual and target evaporator temperatures, for any given period, is relatively small compared with the scheme of FIG. 2. As a result, the compressor speed is ramped up in such a way that does not lead to speeds significantly above that necessary to maintain the final target evaporator temperature, which, of course, is not known ahead of time. (Compressor speeds over that which is required may increase energy consumption of the system 10.)

The rate at which the controller 26 periodically reduces the target evaporator temperature may be generated via testing, simulation, etc. In some embodiments, the rate may depend on cabin humidity, cabin sun load, initial cabin temperature, etc. For example, the rate may increase as initial cabin humidity increases; the rate may increase as initial cabin temperature increases. Of course, any suitable parameters may be used.

User input may also be used to select the rate. In certain embodiments, the consumer may select between a "fuel economy" and "max" mode. The rate may be steeper in "max" mode compared with "fuel economy" mode. Alternatively, a control scheme similar to that depicted in FIG. 2 may be used in "max" mode and a control scheme similar to that depicted in FIG. 3 may be used in "fuel economy" mode. Other scenarios are also possible.

Figure 4:
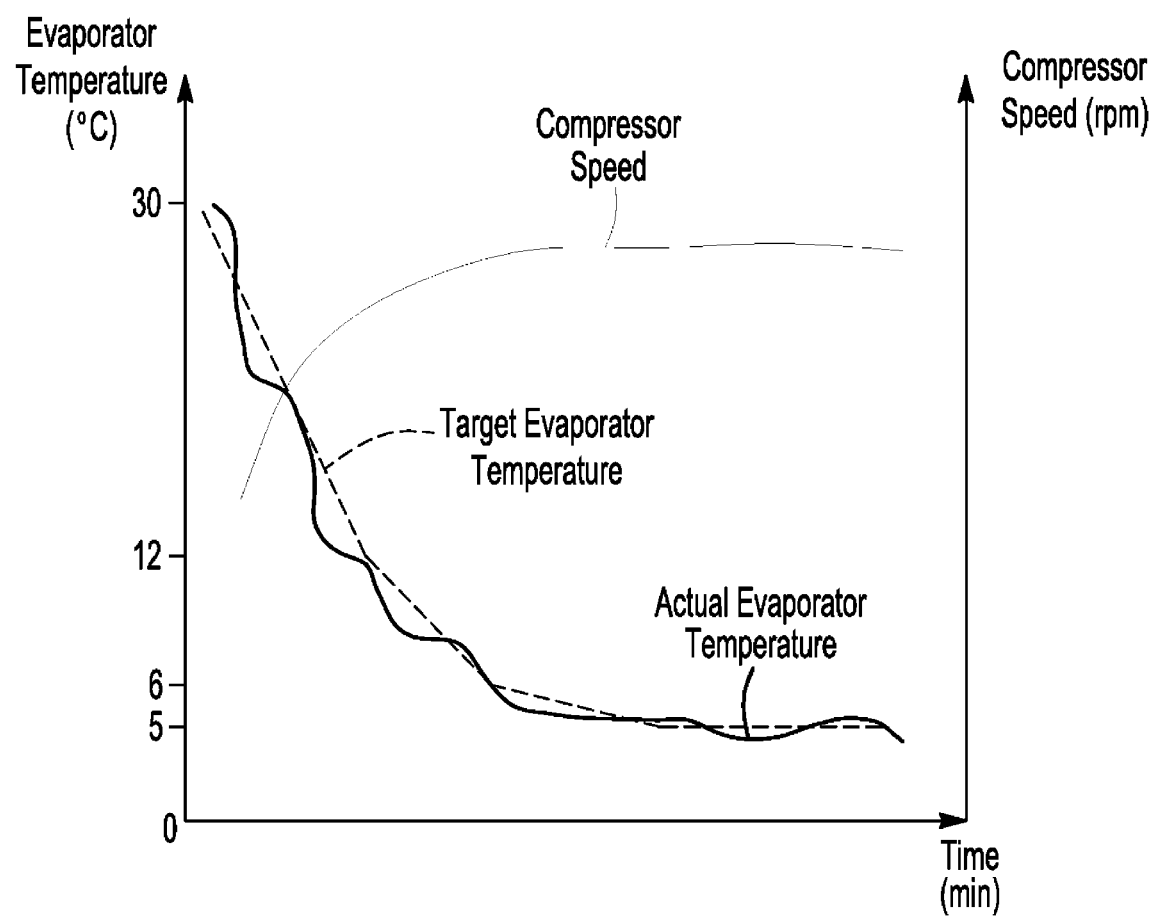
FIG. 4 is yet another example plot of actual evaporator temperature, target evaporator temperature and compressor speed versus time.

Referring now to FIG. 4, several rates are used depending on the instant value of the target evaporator temperature. A first rate (the steepest) is used for target evaporator temperatures between, for example, 30° C. and 12° C. A second rate is used for target evaporator temperatures between, for example, 12° C. and 6° C. A third rate is used for target evaporator temperatures between, for example, 6° C. and 5° C. Of course, any number of rates for any range of temperatures may be used. This control scheme attempts to balance customer comfort with energy usage.

The evaporator temperature is more quickly reduced at the first rate in an effort to affect substantial change in cabin temperature. Once in the vicinity of the desired temperature, less steep rates may be used to more slowly bring cabin temperatures to their desired levels while avoiding operating the compressor 14 at speeds far above that necessary to maintain the desired temperature.

Figure 5:
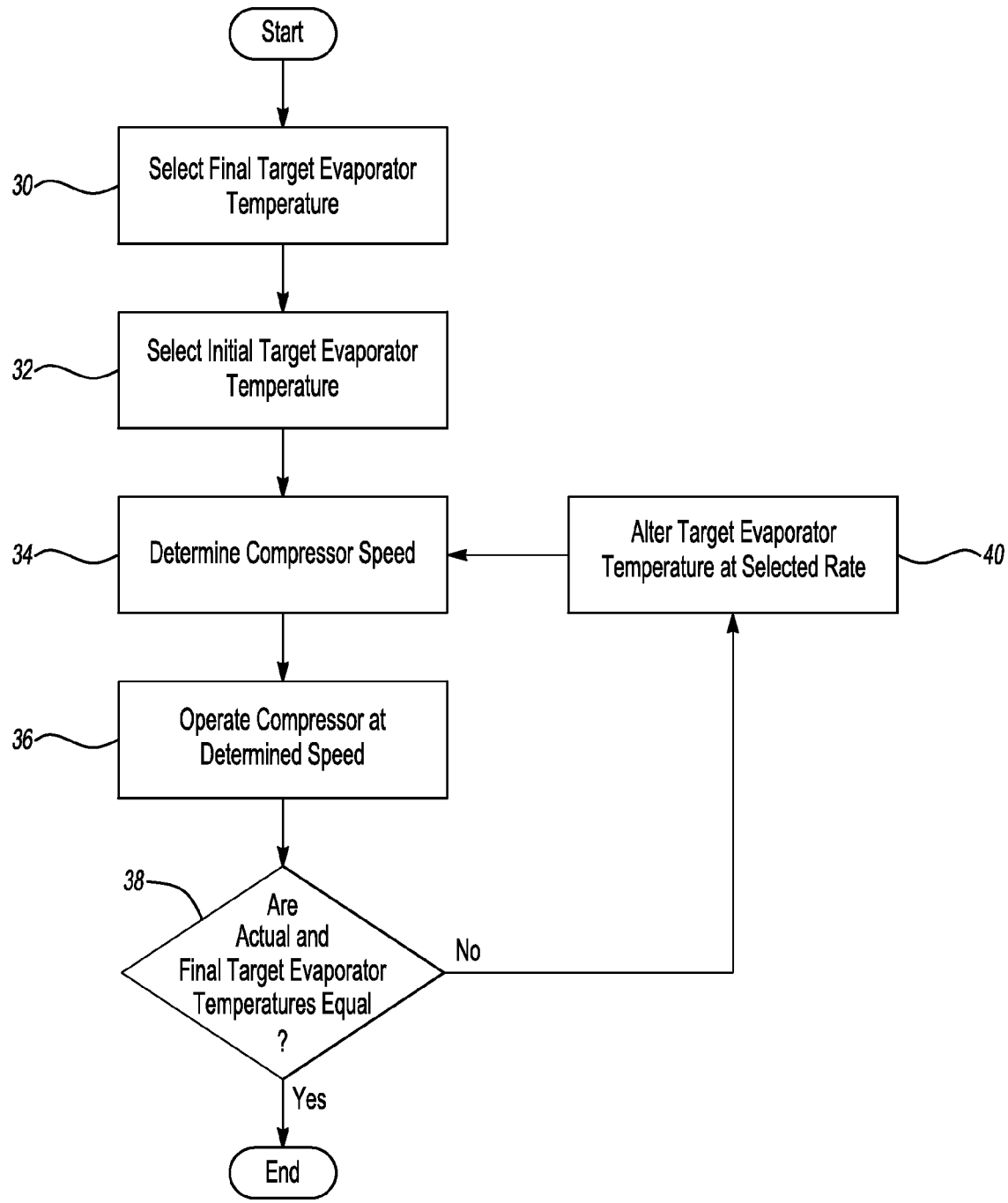
FIG. 5 is a flow chart depicting an example strategy for controlling the compressor of FIG. 1.

Referring now to FIGS. 1 and 5, a final target evaporator temperature is selected as indicated at 30. For example, the controller 26 may receive user input specifying a desired cabin temperature of 6° C. Based on this input and readings from one or more of the sensors 28c-28e, the controller 26 may select a final target evaporator temperature of 4° C. via a look-up table stored in memory (or other suitable mechanism). That is, given the user request and cabin conditions, 4° C. is the required evaporator temperature to provide a steady-state cabin temperature of 6° C. (Of course, this final target evaporator temperature may change based on updated user input, changes in ambient conditions, etc.)

As indicated at 32, an initial target evaporator temperature is selected. Continuing with the above example, input received by the controller 26 from the temperature sensor 28b may indicate that the (initial) actual evaporator temperature is 40° C. The controller 26 may select an initial target evaporator temperature based on the initial actual evaporator temperature:

$$\text{initial target temp.} = \text{initial actual temp.} - 2° \text{ C.} \tag{4}$$

That is, the controller 26 may select, in this example, an initial target evaporator temperature of 38° C. Other suitable techniques, however, may also be used.

As indicated at 34, compressor speed is determined. Initially, the controller 26 may determine the compressor speed based on the actual evaporator temperature, information from sensors 28c-28e, etc. Subsequently, the controller 26 may compute a difference between the actual and target evaporator temperatures and, based on this difference, determine a compressor speed using any suitable technique: a look-up table mapping differences in actual and target evaporator temperatures with compressor speed, analytical techniques relating differences in actual and target evaporator temperatures with compressor speed, etc.

As indicated at 36, the compressor 14 is operated at the speed determined at 34. The controller 26 may command the compressor 14 to operate at the determined speed. This command may be honored until a new speed is determined. The duration of the interval, e.g., 100 milliseconds, may depend design considerations. Any suitable interval, however, may be selected.

As indicated at 38, it is determined whether the actual and final target evaporator temperatures are equal. The controller 26 may receive input from the temperature sensor 28b and compare that with the final target evaporator temperature determined at 30. If they are approximately the same, the strategy may end. If not, the strategy may proceed to 40.

As indicated at 40, the target evaporator temperature is altered at a selected rate. The controller 26 may have received user input specifying the "fuel economy" mode as discussed above. Based on this input and readings from one or more of the sensors 28c-28e, the controller 26 may use two differing rates (a first rate with an aggressive slope and a second rate with a more moderate slope) to periodically alter the target evaporator temperature until the final target evaporator temperature is achieved.

The controller 26 may, for example, partition the difference between the initial actual target evaporator temperature and the final target evaporator temperature into two ranges: the first range being generally equal to ⅔ of the difference and the second range being equal to ⅓ of the difference. As such, the controller 26 may apply the first rate while the target operating temperature is between 40° C. and 16° C. (continuing with the example above), and the second rate while the target operating temperature is between 16° C. and 4° C. Alternatively, the controller 26 may apply a single rate or more than two rates.

Preset target operating temperatures may define breakpoints for differing rates. As an example, a first rate may be applied if the target operating temperature is greater than 15° C. A second rate may be applied if the target operating temperature is less than or equal to 15° C. As such, if the initial target evaporator temperature is 14° C., the controller 26 may only apply a single rate until the final target is achieved (assuming the final target is less than 14° C.). If the initial target evaporator temperature is 28° C., the controller 26 may apply the first rate while the target evaporator temperature is greater than 15° C., and then apply the second rate while the target evaporator temperature is equal to or less than 15° C. (until the final target is achieved). Other scenarios are also possible.

The rate or rates at which the controller 26 alters the target operating temperature may be predefined based on testing, simulation, etc. That is, the controller 26 may access rate information stored in memory and apply it during each operating interval. Analytical methods may also be used to compute the rate based on user input, operating parameters of the vehicle 12, and/or ambient conditions. For example, a rate may be determined as $$\text{rate} = f(\text{ambient temp., sun load, etc.}). \tag{5}$$

As a result, a plot of the target evaporator temperature versus time may be non-linear, unlike the plots of FIGS. 3 and 4. Alternatively, a rate may be expressed as a Δ by which to reduce the previous target evaporator temperature. For example, an updated target evaporator temperature may be determined as $$\text{current target temp.} = \text{previous target temp.} - \Delta. \tag{6}$$

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A method for controlling an automotive climate system comprising:
for each of a plurality of consecutive time intervals,
determining a current target evaporator temperature based on a previous target evaporator temperature, the current target evaporator temperature being different than the previous target evaporator temperature,
selecting a target compressor speed based on a difference between an actual evaporator temperature and the current target evaporator temperature, and
commanding the compressor to operate at the target compressor speed.

2. The method of claim 1 wherein the previous target evaporator temperature is from a preceding time interval.

3. The method of claim 1 further comprising selecting an initial target evaporator temperature based on the actual evaporator temperature.

4. The method of claim 3 further comprising selecting a final target evaporator temperature based on a desired vehicle cabin temperature.

5. The method of claim 1 wherein determining a current target evaporator temperature based on a previous target evaporator temperature includes reducing the previous target evaporator temperature by a selected amount.

6. The method of claim 5 wherein the selected amount is based on user input.

7. A method for controlling a variable speed compressor:
for each of a plurality of consecutive time intervals,
altering a target evaporator temperature from an immediately preceding time interval by a selected amount to generate a current target temperature,
selecting a target compressor speed based on a difference between an actual evaporator temperature and the current target evaporator temperature, and
commanding the compressor to operate at the target compressor speed.

8. The method of claim 7 wherein the selected amount is the same during each of the of time intervals.

9. The method of claim 7 wherein the selected amount is different during at least two of the time intervals.

10. The method of claim 7 further comprising selecting an initial target evaporator temperature based on the actual evaporator temperature.

11. The method of claim 10 further comprising selecting a final target evaporator temperature based on a desired vehicle cabin temperature.

12. The method of claim 7 wherein the selected amount is based on user input.

13. The method of claim 7 wherein the selected amount is based on a state of a vehicle cabin.

* * * * *